US010979853B2

(12) United States Patent
Phillips-Lubimiv et al.

(10) Patent No.: US 10,979,853 B2
(45) Date of Patent: *Apr. 13, 2021

(54) BEACON ADDRESSING

(71) Applicant: AP1 Inc., Toronto (CA)

(72) Inventors: Aaron Lyon Phillips-Lubimiv, Toronto (CA); Jay Fallah, Toronto (CA); Ming Ding, Toronto (CA); Samson Grant Kirk-Koffi, Toronto (CA)

(73) Assignee: AP1 INC., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/552,185

(22) Filed: Aug. 27, 2019

(65) Prior Publication Data

US 2019/0387358 A1 Dec. 19, 2019

Related U.S. Application Data

(63) Continuation of application No. 15/878,264, filed on Jan. 23, 2018, now Pat. No. 10,440,511, which is a continuation of application No. 14/928,639, filed on Oct. 30, 2015, now Pat. No. 9,913,090.

(60) Provisional application No. 62/073,746, filed on Oct. 31, 2014.

(51) Int. Cl.
*H04W 56/00* (2009.01)
*H04W 4/02* (2018.01)
*H04L 29/08* (2006.01)
*H04W 4/80* (2018.01)

(52) U.S. Cl.
CPC .......... *H04W 4/023* (2013.01); *H04L 67/04* (2013.01); *H04L 67/12* (2013.01); *H04L 67/28* (2013.01); *H04L 67/303* (2013.01); *H04W 4/80* (2018.02)

(58) Field of Classification Search
CPC ........ H04W 4/023; H04W 4/80; H04L 67/04; H04L 67/12; H04L 67/28; H04L 67/303
USPC ............................................. 370/329
See application file for complete search history.

(56) References Cited

U.S. PATENT DOCUMENTS

| 7,848,765 B2 | 12/2010 | Phillips et al. |
| 8,000,726 B2 | 8/2011 | Altman et al. |
| 8,024,431 B2 | 9/2011 | Hoffman |
| 8,027,931 B2 | 9/2011 | Kalaboukis |

(Continued)

OTHER PUBLICATIONS

Ferrandis-Ruiz, J., "Communication", European Patent Application No. 15854226.6, dated May 25, 2018, 14 pages.

(Continued)

*Primary Examiner* — Sai Ming Chan

(57) ABSTRACT

The present disclosure describes how a master beacon having a known QUID can be used to capture beacons within its range and superimpose a systematic address scheme on those beacons. The superimposed address scheme can then be used as a proxy for the individual beacons when developing applications that make use of the beacons. A master beacon automatically detects each beacon in a plurality of beacons and, for a set of beacons in the plurality of beacons, automatically changes either the first profile identifier or the second profile identifier for each beacon in the set of beacons. The change is such that the first profile identifier or the second profile identifier is identical for each beacon in the set of beacons and is also associated with the master beacon.

11 Claims, 10 Drawing Sheets

(56) References Cited

U.S. PATENT DOCUMENTS

| | | | |
|---|---|---|---|
| 2002/0176388 A1* | 11/2002 | Rankin | G08G 1/0962 |
| | | | 370/338 |
| 2007/0275701 A1* | 11/2007 | Jonker | H04W 48/16 |
| | | | 455/414.1 |
| 2013/0134906 A1 | 5/2013 | Picariello | |
| 2014/0188708 A1 | 7/2014 | Govindarajan et al. | |
| 2014/0220883 A1* | 8/2014 | Emigh | H04W 8/005 |
| | | | 455/3.01 |
| 2014/0274150 A1 | 9/2014 | Marti et al. | |
| 2015/0281878 A1* | 10/2015 | Roundtree | H04W 4/80 |
| | | | 455/41.2 |

OTHER PUBLICATIONS

"International Search Report and Written Opinion issued in PCT Patent Application No. PCT/CA2015/051112", Filed Date: Oct. 30, 2015, dated Jan. 11, 2016, 7 pages.

Decision to Grant dated Mar. 13, 2020 in connection with Japanese Application No. 2018-237365, 5 pages.

* cited by examiner

BEACON ADDRESSING

CROSS-REFERENCE TO RELATED APPLICATION

This application claims is a continuation of: U.S. application Ser. No. 15/878,264 filed on Jan. 23, 2018 and entitled "BEACON ADDRESSING," which is a continuation of U.S. application Ser. No. 14/928,639 filed on Oct. 30, 2015 and entitled "BEACON ADDRESSING," which claims priority to U.S. Provisional Application No. 62/073, 746 filed on Oct. 31, 2014. This application claims priority to all three of these prior applications and hereby incorporates their disclosures by reference herein for all intents and purposes.

TECHNICAL FIELD

The present invention relates to wireless proximity devices used for location awareness, and more particularly to addressing of such devices.

BACKGROUND

The following "Background" is provided to facilitate a technical understanding of the invention, and the mere inclusion of material in the "Background" shall not be construed as an admission that such material is prior art.

Bluetooth® Low Energy technology (BLE), also known as Bluetooth Smart technology, was introduced as part of the Bluetooth 4.0 specification, and is designed to enable wireless communication by devices which must rely on a small battery for an extended period of time. The Bluetooth 4.0 specification, and its successor the Bluetooth 4.1 specification, both promulgated by the Bluetooth Special Interest Group (Bluetooth SIG), having an address in the United States at 5209 Lake Washington Blvd NE, Suite 350, Kirkland, Wash. 98033.

One application of BLE is in the field of beacons. The term "beacon", as used herein, refers to wireless proximity devices incorporating a BLE unit to transmit data packets of fixed length and format and including identifying information, which can be received by a compatible BLE-enabled receiving device, such as a suitable smartphone or tablet (among others) and used to determine relative proximity between the proximity device and the receiving device. A BLE unit comprises a microchip and antenna configured to transmit the data packet as a BLE-compliant low power radio signal. The transmitted radio signal containing the data packet is referred to as an "advertisement". Software executing on the receiving device can be configured to receive and process an advertisement from a beacon to determine relative proximity to that beacon, and further configured to perform predetermined actions upon detecting specified proximity to particular beacons. By placing beacons in particular fixed locations, real-time position awareness can be provided to receiving devices, independently of other systems such as the Global Positioning Systems (GPS). For example, if a particular beacon is placed above the entrance to a bathroom in a shopping mall, a software program executing on a smartphone could be configured so that when that particular beacon is detected (i.e. because the owner of the smartphone is within BLE range of the beacon), the smartphone alerts the owner of their proximity to the beacon and hence to the bathroom. The proximity of a beacon to a receiver is determined based on relative signal strength, and in present implementations is categorized as "immediate", "near", "far" and "unknown". Thus, by implementing appropriate logic in the software executing on the receiving device, or on another computer coupled to the receiving device via a suitable network, beacons can be used to enable a wide variety of location-based applications. These applications include indoor mapping and way-finding systems, as well as enabling retailers to send proximity-based notifications to customers. One skilled in the art will be familiar with the applicability of BLE and its current specification to beacon technology.

Referring now to FIG. 1, a first exemplary beacon is indicated generally at 100. The exemplary beacon 100 indicates a beacon its most basic form, which comprises a BLE unit 102 adapted to send and receive BLE radio signals, a beacon processing unit 104 coupled to the BLE unit 102 and adapted to control the BLE unit 102, a beacon storage 106 coupled to the beacon processing unit 104 and a power source 108, typically a battery, adapted to provide power to the beacon (specific connections are omitted for ease of illustration). The beacon storage 106 contains the identifying information 110 for the beacon 100. During normal operation, the beacon processing unit 104 retrieves the identifying information 110 for the beacon 100 and causes the BLE unit 102 to periodically transmit the advertisement containing the identifying information 110 for the beacon 100 (referred to as "transmitting mode"). The identifying information 110 for the beacon 100 can be replaced with new identifying information; a suitable BLE-enabled device can transmit a signal to the BLE unit 102 which causes the beacon processing unit 104 to initiate logic for receiving new identifying information for the beacon 100 and for writing the new identifying information for the beacon 100 to the beacon storage 106 (referred to as "receiving mode"). While shown as separate blocks in FIG. 1 for purposes of illustration, one skilled in the art will appreciate that one or more of the BLE unit 102, beacon processing unit 104 and storage 106 may be integrated into a single unit.

Beacons may include additional components as well. FIG. 1A shows a second exemplary beacon 100A, which is similar to FIG. 1 and in which like references denote like features, but with the suffix "A". The beacon 100A, in addition to the BLE unit 102A, beacon processing unit 104A, beacon storage 106A and power source 108A, also includes a temperature sensor 112A and a motion sensor 114A (e.g. an accelerometer), both coupled to the beacon processing unit 104A. Thus, some beacons may transmit data packets that include additional information beyond the identifying information for the beacon. The temperature sensor 112A and motion sensor 114A are merely examples of additional sensors that may be included as part of a beacon; beacons may be provided with a wide array of additional sensors and components.

There are currently four major published beacon protocols for transmitting the advertisement (the data packet containing the identifying information for the beacon): iBeacon, sBeacon (also referred to as s-beacon), AltBeacon and Eddystone. The iBeacon protocol is promulgated by Apple Inc., having an address at 1 Infinite Loop, Cupertino, Calif., U.S.A. 95014. Information about the iBeacon protocol is available at https://developer.apple.com/ibeacon/. The AltBeacon protocol is promulgated by Radius Networks, Inc., having an address at The Powerhouse, 3255 Grace Street NW, Washington, D.C., U.S.A. 20007. Information about the AltBeacon protocol is available at http://altbeacon.org/. The Eddystone protocol is promulgated by Google Inc., having an address at 1600 Amphitheatre Parkway, Mountain View, Calif. 94043, U.S.A. Information about the Eddystone protocol is available at https://developers.google.com/beacons/?h1=en. The sBeacon protocol was promulgated by Signal360, Inc. (formerly Sonic Notify Inc.), having an address at 251 5$^{th}$ Ave, Fl 6, New York City, N.Y., U.S.A. 10016.

Under the present BLE standard the advertisement comprises a 37-octet hexadecimal string which contains identifying information for the beacon. For iBeacon, s-beacon and AltBeacon, the identifying information for the beacon includes a leading sixteen octet universally unique identifier (UUID) for the beacon, followed by a two octet first profile identifier for the beacon, followed by a two octet second profile identifier for the beacon. For example, in the iBeacon format promulgated by Apple Inc., the advertisement comprises an octet indicating the overall length of the advertisement, followed by a second octet set to 0xFF, followed by an octet set to 4C00 (the company ID for Apple Inc.), followed by an octet for data type, followed by an octet for length, followed by the sixteen-octet UUID, followed by the two-octet first profile identifier called "major", followed by the two-octet second profile identifier called "minor", followed by an octet indicating calibration power. In the iBeacon protocol and the sBeacon protocol, the UUID is referred to simply as "UUID", in the AltBeacon protocol the UUID is referred to as "ID1"; in each case it is a sixteen-octet string and provides the same functionality. In the Eddystone protocol, the identifying information for the beacon is an eight octet string which includes a leading five-octet UUID referred to as "Namespace" followed by a three octet profile identifier for the beacon, referred to as "Instance". For simplicity, the term "UUID" is used herein to refer to the leading identifier (e.g. the leading sixteen-octet identifier in the iBeacon, sBeacon and AltBeacon protocols and the leading five-octet "Namespace" identifier in the Eddystone protocol), regardless of the beacon protocol.

Typically, each manufacturer ships its beacons with the identical default UUID, although the first profile identifiers and second profile identifiers may differ (e.g. they may be assigned randomly). The user or installer of the beacons sets the UUID, first profile identifier and second profile identifier to appropriate values so that they will be recognized by the logic of the software program executing on the receiving device. For example, a chain of retail stores may set all of the beacons in all of its locations to have identical UUIDs so that a dedicated mobile phone software application for that chain of retail stores would search for beacons having that UUID.

The first profile identifier can be used to notionally collect beacons into a group, and the second profile identifier can identify individual beacons within a group. Continuing the example of a chain of retail stores, all of the beacons in a particular store location may be given the same first profile identifier to identify that store location, and then individual beacons may be given different second profile identifiers to denote different locations within the store. In the iBeacon protocol, the first profile identifier and the second profile identifier are referred to as "major" and "minor", respectively and in the AltBeacon protocol the first profile identifier and the second profile identifier are referred to as "ID2" and "ID3", respectively. In the sBeacon protocol the first profile identifier and the second profile identifier are collected into a single string referred to as "SID" which can be notionally separated into a first profile identifier component and a second profile identifier component. Similarly, in the Eddystone protocol the three octet "Instance" profile identifier can be notionally separated into a first profile identifier component and a second profile identifier component.

In a multi-beacon environment, the UUID, first profile identifier and second profile identifier must be set individually for each beacon in order to distinguish the beacons from one another. This is a time-consuming process, since it requires sufficient proximity to the beacon whose values are being changed. Moreover, having manufacturers ship beacons with the UUID, first profile identifier and second profile identifier pre-set to the desired values is not a viable solution, since it still requires the user or installer to individually determine the UUID, first profile identifier and second profile identifier for each beacon (i.e. which pre-set beacon is which) to ensure that each beacon is positioned where it should be positioned.

Accordingly, the labor-intensive process required to set or determine the UUID, first profile identifier and second profile identifier for each beacon deployed presents a significant obstacle to the adoption of beacon technology.

SUMMARY

The present disclosure describes how a master beacon having a known UUID can be used to capture beacons within its BLE range and superimpose a systematic address scheme on those beacons. The superimposed address scheme can then be used as a proxy for the individual beacons when developing applications that make use of the beacons.

In one aspect, a method of automatically linking beacons to a first master beacon comprises automatically detecting, by the first master beacon, each beacon in a plurality of beacons, and, for a set of beacons in the plurality of beacons, automatically changing, by the first master beacon, one of a first profile identifier and a second profile identifier for each beacon in the set of beacons, so that the one of the first profile identifier and the second profile identifier is identical for each beacon in the set of beacons and the one of the first profile identifier and the second profile identifier is associated with the master beacon.

The set of beacons may be all of the beacons in the plurality of beacons, or may be a subset of the beacons in the plurality of beacons.

In one embodiment, the one of the first profile identifier and the second profile identifier for each beacon in the set of beacons is the first profile identifier for each beacon in the set of beacons, and the first profile identifier for each beacon in the set of beacons is associated with the master beacon by being identical to a first profile identifier for the master beacon. In this embodiment, the method may further comprise, for each beacon in the set of beacons, automatically changing, by the first master beacon, a second profile identifier for that beacon to be unique within the set of beacons.

The method may comprise, for each beacon in the set of beacons, before automatically changing the first profile identifier for that beacon and the second profile identifier for that beacon, the first master beacon automatically switching that beacon from a transmitting mode into a receiving mode, and after automatically changing the first profile identifier for that beacon and the second profile identifier for that beacon, the first master beacon automatically switching that beacon from the receiving mode into the transmitting mode. Automatically detecting, by the first master beacon, each beacon in the plurality of beacons may comprise the first master beacon obtaining an advertisement from each beacon, and the first master beacon automatically switching each beacon in the set of beacons from the transmitting mode into the receiving mode may comprise, for each beacon in the set of beacons, the first master beacon using the advertisement from that beacon to identify a security protocol for that beacon and using the security protocol for that beacon to switch that beacon from the transmitting mode into the receiving mode. The first master beacon automatically switching each beacon in the set of beacons from the receiving mode into the transmitting mode may comprise, for each beacon in the set of beacons, using the security protocol for that beacon to switch that beacon from the receiving mode into the transmitting mode.

For each beacon in the set of beacons, the master beacon may store, in a master database on a server remote from the master beacon, a UUID for that beacon, the changed first profile identifier for that beacon and the changed second profile identifier for that beacon.

In one embodiment, for each beacon, before automatically changing the first profile identifier for that beacon and the second profile identifier for that beacon, the first master beacon checks the master database for whether that beacon is already associated with another active master beacon and, for each beacon, the first master beacon automatically changes the first profile identifier for that beacon and the second profile identifier for that beacon only if that beacon is not already associated with another active master beacon.

In one embodiment, the server may assign the first master beacon and a second master beacon to a single logical network zone within a larger network, and the server may change a master beacon identifier for at least one of the first master beacon and the second master beacon so that the first master beacon and the second master beacon have a common master beacon identifier, with the common master beacon identifier being globally unique within the network.

The master beacon may, for each beacon in the set of beacons, triangulate an estimated position of that beacon and store the estimated position of that beacon in the master database.

In another aspect, a beacon network comprises a master beacon and a plurality of beacons within BLE range of the master beacon. The master beacon comprises a master beacon processing unit, at least one of a cellular communication unit and a wireless local network unit coupled to the master beacon processing unit, a BLE-capable Bluetooth unit coupled to the master beacon processing unit, a master beacon storage coupled to the master beacon processing unit, and a power source adapted to power the master beacon. The master beacon storage stores a master beacon identifier for the master beacon, a first profile identifier for the master beacon, a second profile identifier for the master beacon, and instructions executable by the master beacon processing unit. Each beacon comprises a BLE unit, a beacon processing unit coupled to the BLE unit, a beacon storage coupled to the beacon processing unit and a power source adapted to power the beacon. For each beacon in the plurality of beacons, the beacon storage stores a UUID for that beacon, a first profile identifier for that beacon, the first profile identifier for that beacon being identical to the first profile identifier for the master beacon, and a second profile identifier for that beacon. The instructions stored by the master beacon storage comprise instructions for connecting to a remote server using the at least one of the cellular communication unit and the wireless local network unit and instructions for changing the first profile identifiers for the beacons.

In one embodiment, for each beacon in the plurality of beacons, the second profile identifier for that beacon is unique within the plurality of beacons and the instructions stored by the master beacon storage further comprise instructions for changing the second profile identifiers for the beacons.

BRIEF DESCRIPTION OF THE DRAWINGS

These and other features will become more apparent from the following description in which reference is made to the appended drawings wherein.

DETAILED DESCRIPTION

Figure 2:
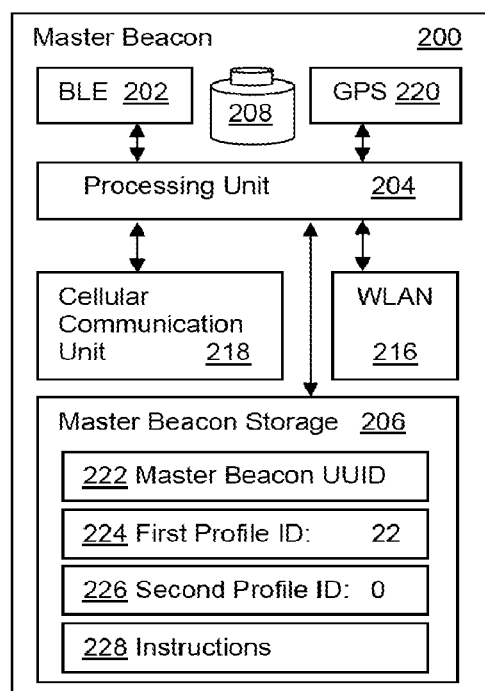
FIG. 2 is a block diagram showing an exemplary master beacon.

Reference is now made to FIG. 2, which is a block diagram showing an exemplary master beacon 200. The exemplary master beacon 200 comprises a Bluetooth unit 202, a master beacon processing unit 204, a master beacon storage 206, a power source 208, a wireless local area network (WLAN) unit 216, a cellular communication unit 218 and a GPS unit 220. The Bluetooth unit 202 is BLE-capable and is adapted to send and receive BLE radio signals, including sending BLE radio signals for switching a beacon between transmitting mode and receiving mode and writing new data to a beacon storage. The WLAN unit 216 enables wireless connection to a local network, through which the beacon 200 may further connect to other networks such as the Internet, and the cellular communication unit 218 enables connection to the Internet via a cellular network. The GPS unit 220 provides positioning information. The power source 208 is typically a battery, and is adapted to provide power to the other components (specific connections are omitted for ease of illustration). Each of the Bluetooth unit 202, master beacon storage 206, power source 208, WLAN unit 216, cellular communication unit 218 and GPS unit 220 is coupled to the master beacon processing unit 204. The master beacon storage 206 stores a master beacon identifier (UUID) 222 for the master beacon 200, a first profile identifier 224 for the master beacon 200, a second profile identifier 226 for the master beacon 200, and instructions 228 executable by the master beacon processing unit 204. The master beacon processing unit 204 may be, for example, an ARM controller. The block diagram shown in FIG. 2 is provided for purposes of illustrating the components of the master beacon 200 in a functional sense, and is not intended to impose architectural or physical limitations on construction of master beacons according to the present disclosure. Components shown as distinct in FIG. 2 may be integrated and combined with one another without departing from the present disclosure; for example, the master beacon processing unit and the master beacon storage may be integrated.

While the exemplary master beacon 200 shown in FIG. 2 represents one preferred embodiment of a master beacon, other embodiments are also contemplated. For example, a master beacon intended for fixed placement may include only a Bluetooth unit, a master beacon processing unit, a master beacon storage, a power source and a WLAN unit, without any cellular communication unit or GPS unit. Similarly, a master beacon may include a Bluetooth unit, a master beacon processing unit, a master beacon storage, a power source and a cellular communication unit, without any WLAN unit and with or without a GPS unit. A master beacon may also include additional components not shown in FIG. 2, such as sensors of various types. A master beacon may or may not be provided with a display; preferably no display is provided in order to reduce costs. In one alternate embodiment, a master beacon may be implemented by way of a conventional smartphone having a BLE-capable Bluetooth unit as described above and which stores and executes the instructions required to behave as a master beacon, as described further below.

Figure 3:
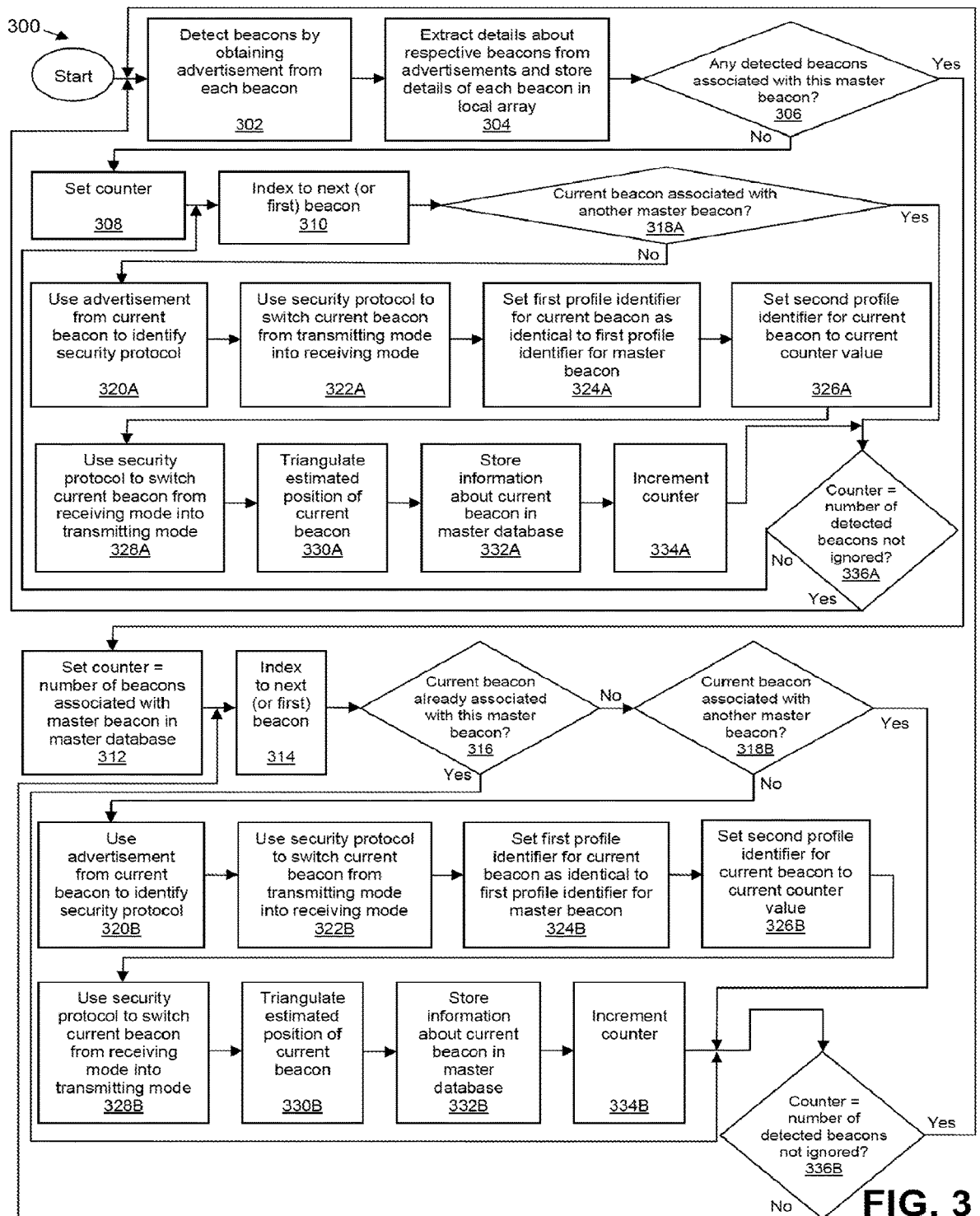
FIG. 3 is a flow chart showing an exemplary method for automatically linking a plurality of beacons to a master beacon.

Reference is now made to FIG. 3, which is a flow chart showing an exemplary method 300 for automatically linking a plurality of beacons to a (first) master beacon. Each of the linked beacons is within BLE range of the master beacon. The method 300 is primarily executed by the (first) master beacon. Each of the steps of the method 300 is preferably executed automatically, without human intervention.

At step 302, the master beacon, which is in receiving mode, automatically detects each beacon in the plurality of beacons by obtaining an advertisement from each beacon. At step 304, the master beacon extracts details about the respective beacons from the advertisements and stores the details of each beacon in a local array. The details will include the UUID, first profile identifier and second profile identifier for each beacon detected.

At step 306, the master beacon checks a master database on a server remote from the master beacon to determine whether any of the detected beacons are already listed in the master database as being associated with the master beacon that is executing the method 300. A "no" determination at step 306 indicates that the master beacon is performing an initialization, and the method 300 proceeds to step 308 and a "yes" determination at step 306 indicates that the master beacon is performing an update and the method 300 proceeds to step 312.

At step 308, the master beacon sets a counter equal to 0, and then proceeds to step 310 to index to the next (or first) detected beacon, after which the master beacon proceeds to step 318A and checks the master database to determine whether the current beacon is already associated with another (second) active master beacon. Responsive to a "yes" determination at step 318A indicating that the current beacon is already associated with another (second) master beacon, the master beacon proceeds to step 336A, described below. In other words, the master beacon executing the method 300 will not interfere with a beacon that is already associated with another master beacon. Responsive to a "no" determination at step 318A indicating that the current beacon is not associated with any other master beacon, the master beacon then proceeds to step 320A. Step 318A may be omitted in a case where the physical arrangement of beacons precludes the possibility that a beacon will be in BLE range of more than one master beacon. Optionally, after a "yes" determination at step 318A, before proceeding to step 336A, the (first) master beacon checks the master database for the most recent heartbeat from the (second) master beacon to confirm that the (second) master beacon remains active. In such an embodiment, if the (first) master beacon determines that the (second) master beacon is not active, the (first) master beacon may provide an alert to the remote server, and may proceed to step 320A. This provides the potential for failover capability.

Over the course of steps 320A and 322A, the master beacon switches into transmitting mode and switches the current beacon from the transmitting mode into the receiving mode. At step 320A, the master beacon determines the appropriate security protocol. Since the advertisement will include the UUID for the beacon, and the UUID will be initially set to the manufacturer default, the master beacon can use the UUID to identify the beacon manufacturer and retrieve the appropriate security protocol from the master beacon storage. Alternatively, the security protocol may be retrieved from a remote location, such as the remote server. After step 320A, the master beacon proceeds to step 322A, where the master beacon uses the security protocol for the current beacon to switch that beacon from the transmitting mode into the receiving mode, and then proceeds to step 324A. When a beacon is in the transmitting mode, the UUID, first profile identifier and second profile identifier for the beacon generally cannot be altered, whereas when the beacon is in the receiving mode, such alteration is permitted.

At step 324A, the master beacon sets the first profile identifier for the current beacon to be identical to the first profile identifier for the master beacon, and then proceeds to step 326A, where the master beacon sets the second profile identifier for the current beacon to be equal to the current counter value. Since the counter will be incremented at step 334A before the next beacon is handled, setting the second profile identifier for the current beacon to be equal to the current counter value will result in the second profile identifier for that beacon being unique within the plurality of beacons associated with the master beacon. Other approaches besides a counter may also be used to assign values to the second profile identifier of each beacon such that the second profile identifier values are unique within the plurality of beacons associated with the master beacon. After step 326A, the master beacon proceeds to step 328A. Steps 324A and 326A may be performed in reverse order.

At step 328A, the master beacon uses the security protocol for the current beacon, identified at step 320A, to switch the current beacon from the receiving mode back into the transmitting mode.

Thus, considering steps 320A through 328A, before changing the first profile identifier (step 324A) and the second profile identifier (step 326A) for the current beacon, the master beacon switches that beacon from a transmitting mode into a receiving mode (steps 320A and 322A), and after changing the first profile identifier (step 324A) and the second profile identifier (step 326A) for the current beacon, the master beacon switches that beacon from the receiving mode back into the transmitting mode (step 328A). Steps 320A through 328A may be conceptualized as the master beacon "capturing" the current beacon. After step 328A, the master beacon proceeds to step 330A. As can be seen in FIG. 3, steps 320A through 328A, as well as steps 330A and 332A, are omitted for detected beacons which step 318A determines are already associated with another master beacon. Thus, steps 320A through 332A will be performed for a set of beacons in the plurality of detected beacons. If none of the detected beacons are already associated with another master beacon, the set of beacons for which steps 320A through 332A will be performed is all of the beacons in the plurality of beacons. If there is at least one detected beacon that is already associated with another master beacon and at least one detected beacon that is not already associated with another master beacon, the set of beacons for which steps 320A through 332A will be performed is a subset of the beacons in the plurality of beacons. If all of the detected beacons are already associated with another master beacon, the set of beacons for which steps 320A through 332A will be performed is an empty set, that is, steps 320A through 332A will not be performed for any of the detected beacons.

At step 330A, the master beacon triangulates an estimated position of the current beacon relative to the master beacon. The master beacon, or the remote server, can generate a map showing the relative positions of each beacon, with the master beacon as origin, and can track movement of a beacon as the master beacon cycles through the method 300. This movement data can be used for a variety of purposes. Suitable methods of triangulation are within the capability of one skilled in the art, now informed by the present disclosure. After step 330A, the master beacon then proceeds to step 332A, where the master beacon stores information about the current beacon in the master database on the remote server. The information stored in the master database on the remote server includes the (unchanged) UUID for the current beacon, the changed first profile identifier for the current beacon, the changed second profile identifier for the current beacon and the estimated position. Because the master beacon only proceeds to steps 320A to 332A if step 318A indicates that the current beacon is not associated with any other master beacon, the master beacon changes the first profile identifier and the second profile identifier for the current beacon only if that beacon is not already associated with another active master beacon.

Following step 332A, the master beacon proceeds to step 334A and increments the counter. Thus, the master beacon will only reach step 334A to increment the counter after capturing the current beacon at steps 320A through 328A and storing the information about the current beacon at step 332A. If step 318A indicated that the current beacon is already associated with another (second) master beacon, the counter is not incremented because the master beacon proceeds directly from step 318A to step 336A. After incrementing the counter at step 334A, or after a "yes" determination at step 318A, the master beacon proceeds to step 336A.

At step 336A, the master beacon checks whether the counter is equal to the number of detected beacons less the number of beacons that were ignored because of a determination at step 318A that they were associated with another active master beacon (another counter may be used to track the number of detected beacons that were ignored). Responsive to a determination that the counter is less than the number of detected beacons (minus the beacons that were ignored) ("no" at step 336A), indicating that there are more beacons to be handled, the master beacon returns to step 310 to index to the next beacon. Responsive to a determination that the counter is equal to the number of detected beacons less the beacons that were ignored ("yes" at step 336A), indicating that all of the detected beacons have been handled (either by being ignored at step 318A or captured at steps 320A through 328A), the master beacon then returns to step 302 to again listen for beacon advertisements. The master beacon may pause for a predetermined period between step 336A and step 302.

Where there is a "yes" determination at step 306, this indicates that the master beacon is performing an update, rather than an initialization as described above with reference to steps 308 to 336A, and the method 300 proceeds to step 312 rather than step 308.

At step 312, the master beacon sets a counter equal to the number of beacons already associated with the master beacon in the master database, and then proceeds to step 314 to index to the next (or first) detected beacon, after which the master beacon proceeds to step 316 and checks the master database to determine whether the current beacon is already associated with the master beacon executing the method 300. Responsive to a "yes" determination at step 316 indicating that the current beacon is already associated with the master beacon executing the method 300, the master beacon proceeds to step 336B described below. Thus, the master beacon executing the method 300 will take no action with respect to a beacon that is already associated with that master beacon. Optionally, where the current beacon is already associated with the master beacon executing the method 300, the master beacon may verify that the details extracted from the advertisement for the current beacon reflect the records in the master database. Responsive to a "no" determination at step 316, indicating that the current beacon is not associated with the master beacon executing the method 300, the master beacon then proceeds to step 318B.

Step 318B is analogous to step 318A, and at step 318B the master beacon checks the master database to determine whether the current beacon is already associated with another (second) active master beacon. Responsive to a "yes" determination at step 318B indicating that the current beacon is already associated with another (second) master beacon (and if the other (second) master beacon is active), the master beacon proceeds to step 336B, and responsive to a "no" determination at step 318B indicating that the current beacon is not associated with any other master beacon, the master beacon then proceeds to step 320B.

Steps 320B to 334B are identical to steps 320A to 334A: the master beacon captures the current beacon (steps 320B to 328B), triangulates an estimated position of the current beacon (step 330B), stores information about the current beacon in the master database on the remote server (step 332B) and increments the counter (step 334B). After step 334B, or after a "yes" determination at step 318B, the master beacon proceeds to step 336B.

Step 336B is similar to step 336A, but also accounts for the possibility that a beacon was ignored because it is already associated with the master beacon executing the method 300. At step 336B, the master beacon checks whether the counter is equal to the number of detected beacons less the number of beacons that were ignored because of either a determination at step 316 that they were already associated with the master beacon executing the method 300 or a determination at step 318A that they were associated with another active master beacon. Responsive to a determination that the counter is less than the number of detected beacons minus ignored beacons ("no" at step 334B), indicating that there are more beacons to be handled, the master beacon returns to step 314 to index to the next beacon. Responsive to a determination that the counter is equal to the number of detected beacons less the number ignored beacons ("yes" at step 336B), indicating that all of the detected beacons have been handled (either by being ignored at step 316 or 318B or captured and their information stored at steps 320B through 332B), the master beacon then returns to step 302 to again listen for beacon advertisements. The master beacon may pause for a predetermined period between step 336B and step 302.

In the method 300 shown in FIG. 3, the beacons may be captured in any arbitrary order as long as all beacons are captured.

The method 300 shown in FIG. 3 is merely one exemplary method, and other methods are also enabled by the present disclosure. For example, and without limitation, an alternate method could omit the specialized treatment of an initiation condition. Such a method would omit steps 306 to 336A, and proceed directly from step 304 to step 312.

Reference is now made to FIGS. 4A to 4F, which illustrate schematically an exemplary implementation of the method 300.

Figure 1:
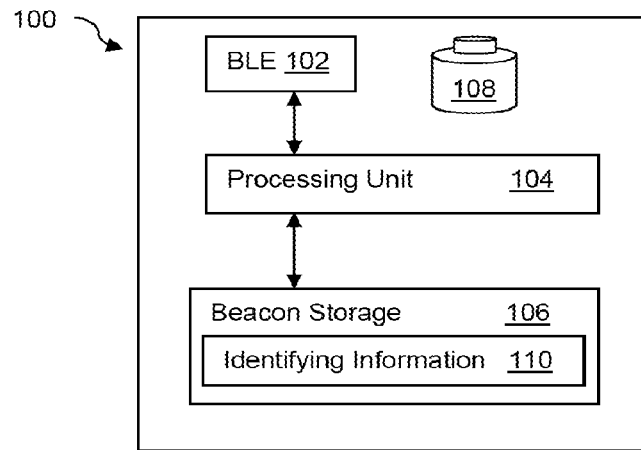
FIG. 1 is a block diagram showing a first exemplary prior art beacon.
Figure 1A:
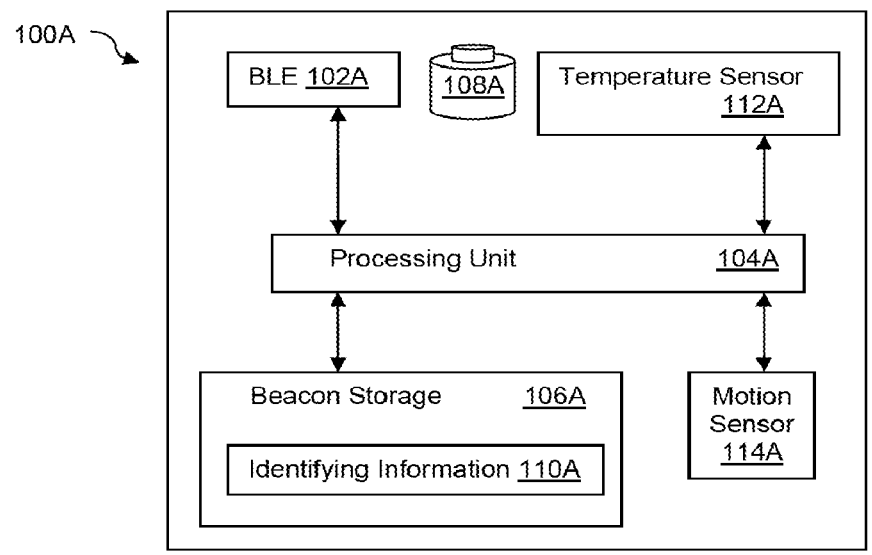
FIG. 1A is a block diagram showing a second exemplary prior art beacon.
Figure 4A:
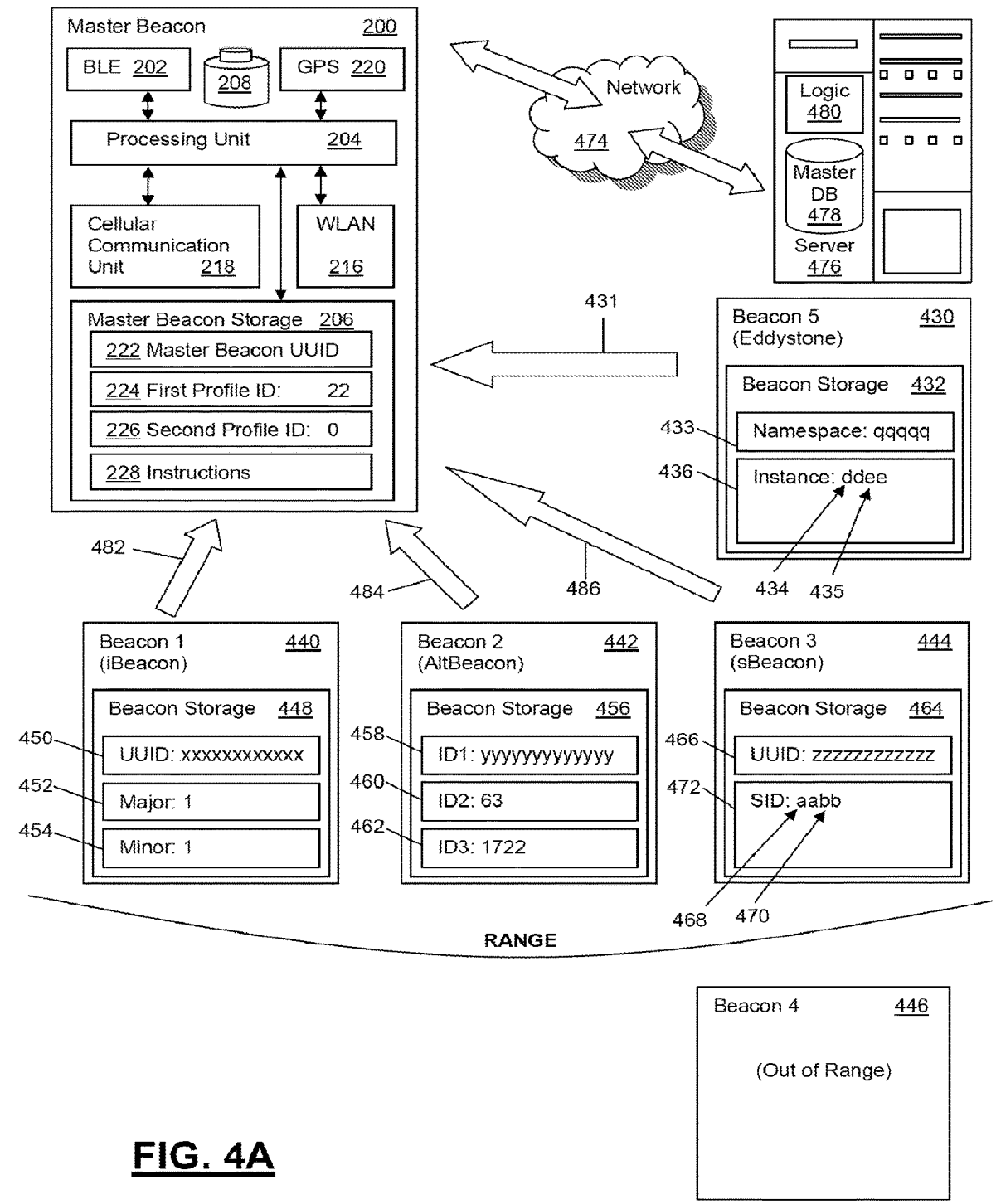
FIGS. 4A to 4F illustrate schematically the method of FIG. 3.

Referring first to FIG. 4A, the exemplary master beacon 200 shown in FIG. 2 is within BLE range of three beacons, namely a first beacon 440 which transmits its advertisement 482 according to the iBeacon protocol, a second beacon 442 which transmits its advertisement 484 according to the AltBeacon protocol, and a third beacon 444 which transmits its advertisement 486 according to the sBeacon protocol. A fourth beacon 446 is out of BLE range with respect to the master beacon 200; since it is out of range the protocol used by the fourth beacon 446 is not material. A fifth beacon 430 transmits its advertisement 431 according to the Eddystone protocol. The beacons 440, 442, 444, 446, 430 are conventional, for example as shown in FIGS. 1 and 1A.

The first beacon 440 has a beacon storage 448 which stores a UUID 450, a first profile identifier ("major") 452 and a second profile identifier ("minor") 454. The second beacon 442 similarly has a beacon storage 456 which stores a UUID ("ID1") 458, a first profile identifier ("ID2") 460 and a second profile identifier ("ID3") 462 and the third beacon 444 has a beacon storage 464 which stores a UUID 466 and stores the first profile identifier 468 and the second profile identifier 470 as a single "SID" string 472. The fifth beacon 430 has a beacon storage 432 which stores a UUID ("Namespace") 433 and stores the first profile identifier 434 and the second profile identifier 435 as a single "Instance" string 436.

For simplicity of illustration, FIGS. 4A to 4F show only the beacon storage 448, 456, 464, 432 of the respective beacons 440, 442, 444, 430 with the other components of the beacons 440, 442, 444, 430 (e.g. processing unit, power source, etc.) not specifically shown.

The master beacon 200 is coupled via network 474, which may comprise one or more interconnected computer networks including the Internet, to a server 476 that is in a location physically remote from the master beacon 200 and hence is a remote server 476. While only a single server 476 is shown in FIGS. 4A to 4F for purposes of illustration, it is to be understood that the term "server", as used herein, encompasses a plurality of cooperatively interconnected computers whether in the same location or geographically dispersed. The server 476 hosts the master database 478, which contains information about the network of beacons and master beacons of which the beacons 440, 442, 444, 430 and master beacon 200 form a part. The server 476 also executes program logic 480 which operates on the master database 478 and interacts with the master beacon 200.

FIG. 4A shows an initial state, before the master beacon 200 has captured any of the beacons 440, 442, 444, 430. The first beacon 440, second beacon 442 and third beacon 444 each have their manufacturer default UUID 450, 458, 466 denoted, respectively, by the arbitrary strings "xxxxxxxxxxxx", "yyyyyyyyyyyy" and "zzzzzzzzzzzz". Although these strings are 12 characters in length for purposes of illustration, they are merely placeholders and not intended as a literal representation of ASCII characters; the UUIDs 450, 458, 466 that they depict are of the standard sixteen-octet length used for the iBeacon, AltBeacon and sBeacon protocols). Similarly, the fifth beacon 430 has a default UUID 433 denoted by arbitrary 5 character string qqqqq for purposes of illustration while the UUID 433 is of the standard five octet length for the Eddystone beacon protocol.

Figure 4B:
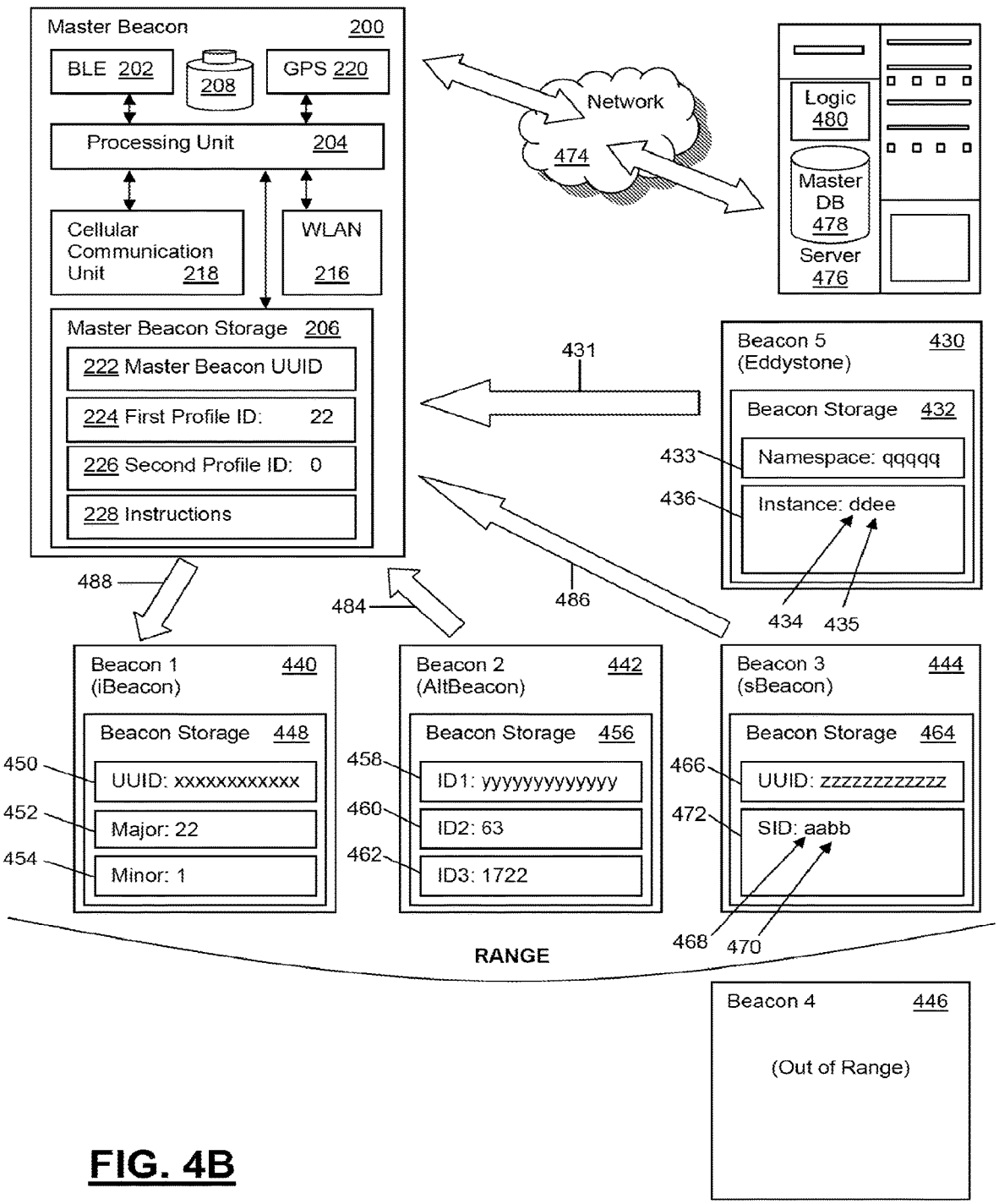

The first beacon 440 has a first profile identifier ("major") 452 of "1" and a second profile identifier ("minor") 454 of "1", the second beacon 442 has a first profile identifier ("ID2") 460 of "63" and a second profile identifier ("ID3") 462 of "1722" and the third beacon 444 has a first profile identifier 468 of "aa" and a second profile identifier 470 "bb" combined as a single "SID" string 472. The fifth beacon 430 has a first profile identifier 434 of "dd" and a second profile identifier 435 "ee" combined as a single "Instance" string 436. The master beacon 200 has a first profile identifier 224 of "22" and a second profile identifier 226 of "0". In a preferred embodiment, the master beacon will always have its second profile identifier set to "0" to denote its status as the master beacon. The string lengths and values shown for the first profile identifiers 452, 460, 468, 434, 224 and second profile identifiers 454, 462, 470, 435 shown in FIGS. 4A to 4F and in FIG. 5 are merely for purposes of illustration and are not intended as a literal representation of ASCII characters; the octet lengths of the first profile identifiers 452, 460, 468, 434, 224 and second profile identifiers 454, 462, 470, 435 are of the standard lengths according to the respective protocols. Similarly, the string lengths and values shown for the first profile identifier 224 and the second profile identifier 226 for the master beacon 200 in FIGS. 4A to 4F and in FIG. 5, and for the first profile identifier 5224 and the second profile identifier 5226 for the second master beacon 5200 shown in FIG. 5, are merely for purposes of illustration and do not represent literal ASCII characters or octet lengths.

In the initial state shown in FIG. 4A, the master beacon 200 detects the beacons 440, 442, 444, 430 by obtaining respective advertisements 482, 484, 486, 431 from each of the beacons 440, 442, 444, 430 (step 302 in the method 300 shown in FIG. 3). The master beacon 200 then extracts details about the beacons 440, 442, 444, 430 from the advertisements 482, 484, 486, 431 and stores details of each beacon 440, 442, 444, 430 in a local array in the master beacon storage 206 (step 302 in the method 300 shown in FIG. 3). The master beacon 200 then communicates via the network 474 with the server 476 to check whether the master database 478 shows any of the detected beacons 440, 442, 444, 430 as already being associated with the master beacon 200 (step 306 in the method 300 shown in FIG. 3). Since FIG. 4A shows an initial state, a "no" is returned, and the master beacon 200 executes steps 308 and 310 of the method 300 in FIG. 3 to set the counter=0 and index to the first beacon 440. The master beacon 200 then checks whether the first beacon 440 is already associated with another master beacon (step 318A in the method 300 shown in FIG. 3), and receives a "no".

The master beacon 200 uses the advertisement 482 from the first beacon 440 to identify and retrieve the appropriate security protocol from the master beacon storage 206 (step 320A in the method 300 shown in FIG. 3). Referring now to FIG. 4B, the master beacon 200 then initiates a communications channel 488 with the first beacon 440, using the retrieved security protocol to switch the first beacon 440 from transmitting mode into receiving mode (step 322A in the method 300 shown in FIG. 3). The master beacon 200 then sets the first profile identifier ("major") 452 for the first beacon 440 as identical to the first profile identifier 224 for the master beacon 200 (step 324A in the method 300 shown in FIG. 3). Thus, the master beacon 200 changes the first profile identifier ("major") 452 for the first beacon 440 from its initial value of "1" to "22", matching the first profile identifier 224 of the master beacon 200. Next, the master beacon 200 sets the second profile identifier ("minor") 454 for the first beacon 440 equal to the current counter value (step 326A in the method 300 shown in FIG. 3). Since the first beacon 440 is the first beacon to be handled, the counter value is "1". Although the master beacon 200 replaces the initial value of the second profile identifier ("minor") 454 for the first beacon 440 with the new value, since the initial value was "1" and the new value is also "1", there is no net change in the second profile identifier ("minor") 454 for the first beacon 440; the absence of any net change is merely coincidental.

After setting the first profile identifier ("major") 452 and the second profile identifier ("minor") 454 for the first beacon 440, as shown in FIG. 4B, the master beacon uses the security protocol to switch the first beacon 440 from the receiving mode back into the transmitting mode (step 328A in the method 300 shown in FIG. 3). The master beacon 200 then triangulates the estimated position of the first beacon 440 (step 330A in the method 300 shown in FIG. 3) and stores the relevant information about the first beacon 440 in the master database 478 via the network 474 (step 332A in the method 300 shown in FIG. 3). The information stored in the master database 478 on the remote server 476 includes the (unchanged) UUID 450 for the first beacon 440, the changed first profile identifier 452 for the first beacon 440, the changed second profile identifier 454 for the first beacon 440, and the triangulated estimated location of the first beacon 440. Other information stored may include types of onboard sensors on the beacon and, when encoded in the advertisement, sensor data feeds, battery level, transmission power, and so on. Any information that can be determined from a beacon's advertisement can be stored. As can be seen in FIG. 4B, the master beacon 200 has not changed the UUID 450 of the first beacon 440 from the initial manufacturer default value, as denoted by the string "xxxxxxxxxxxx".

Figure 4C:
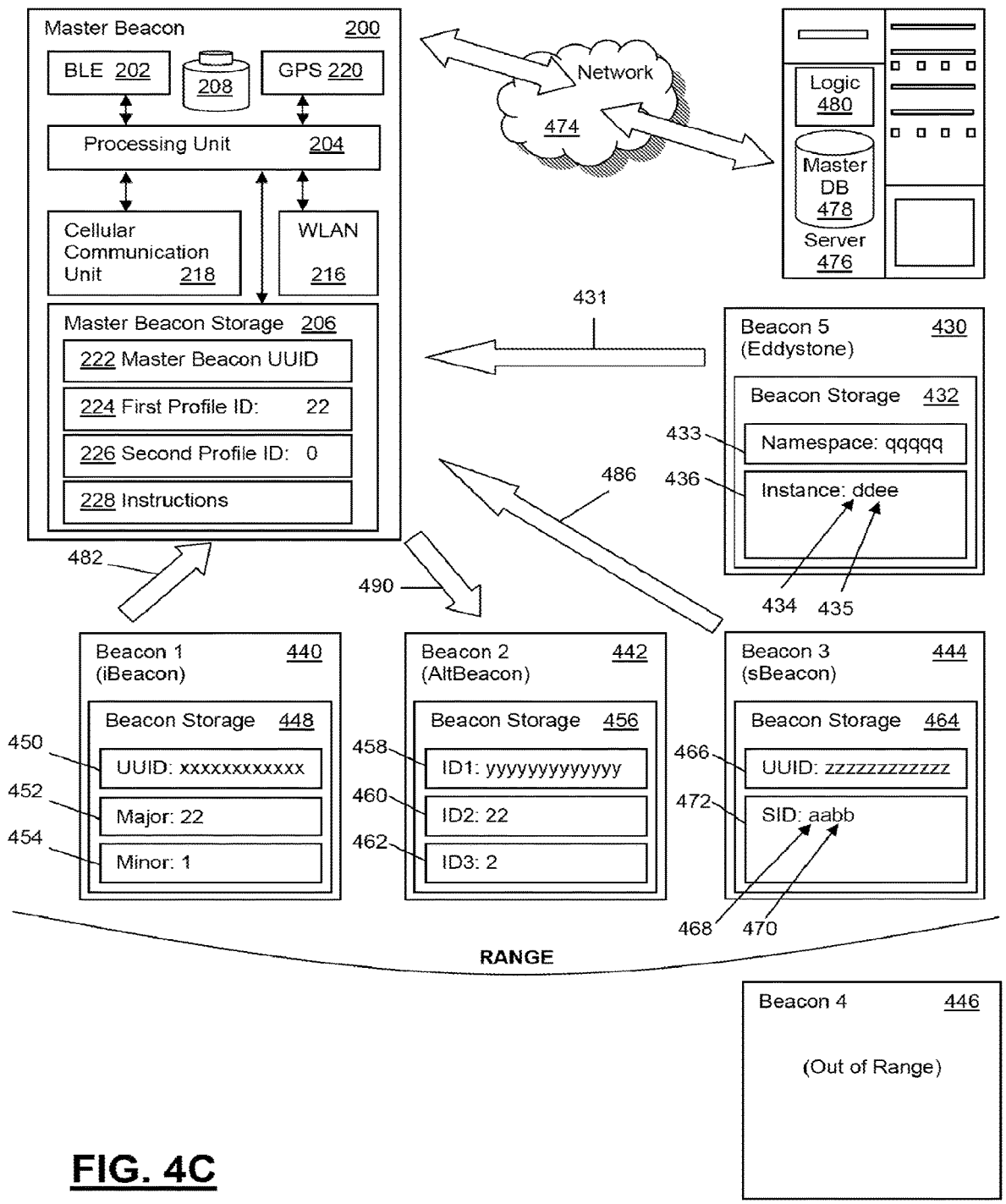
Figure 4D:
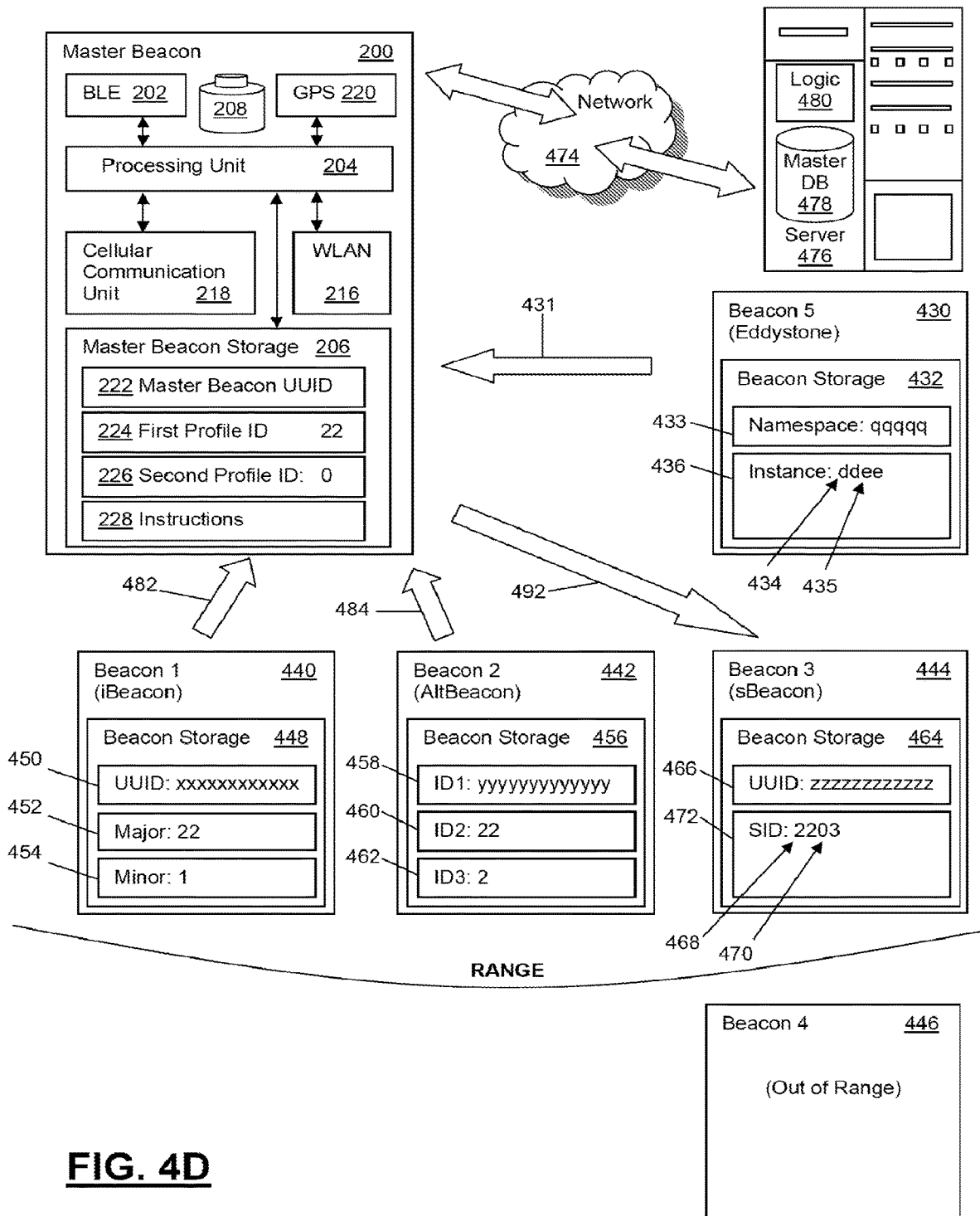
Figure 4E:
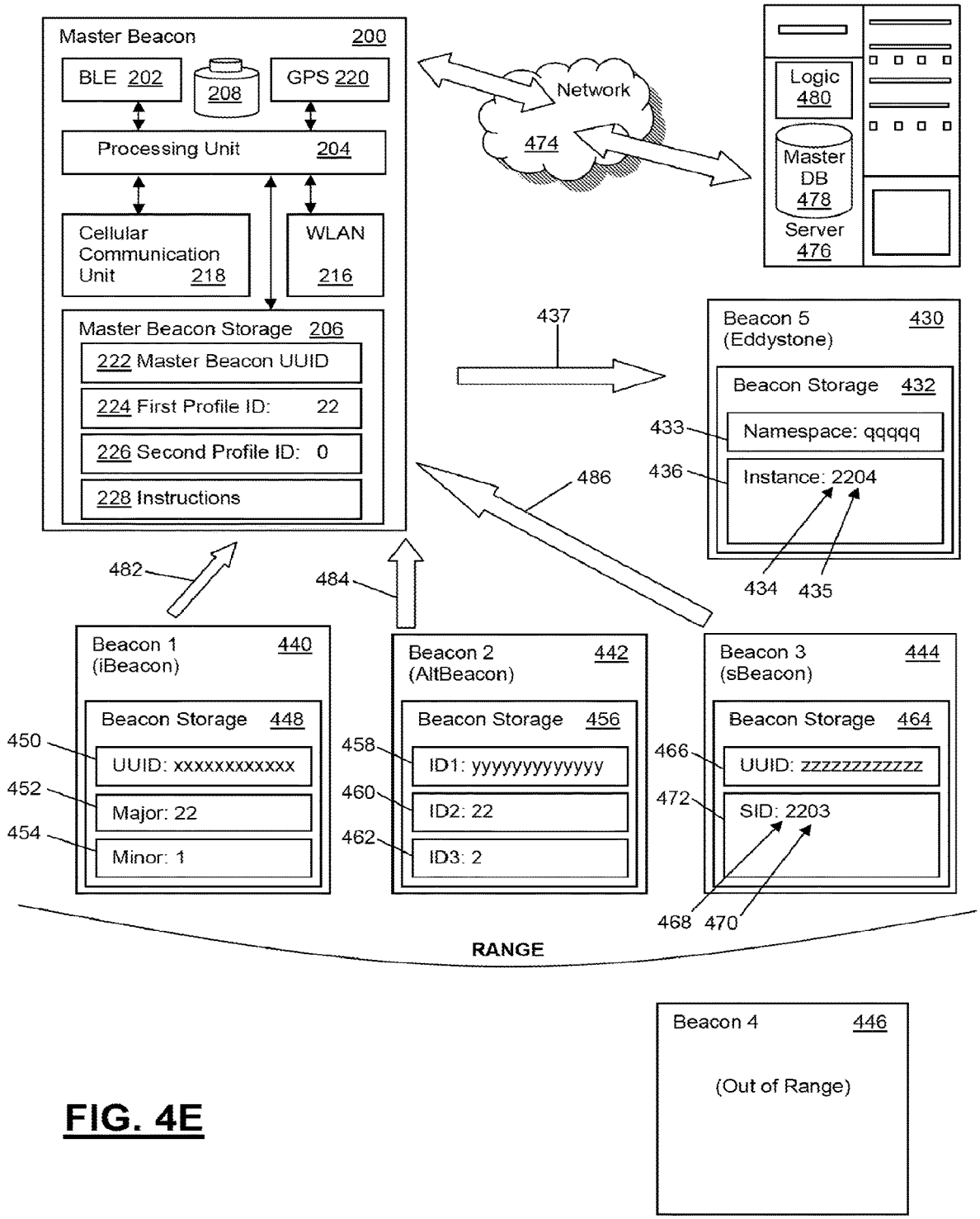
Figure 5:
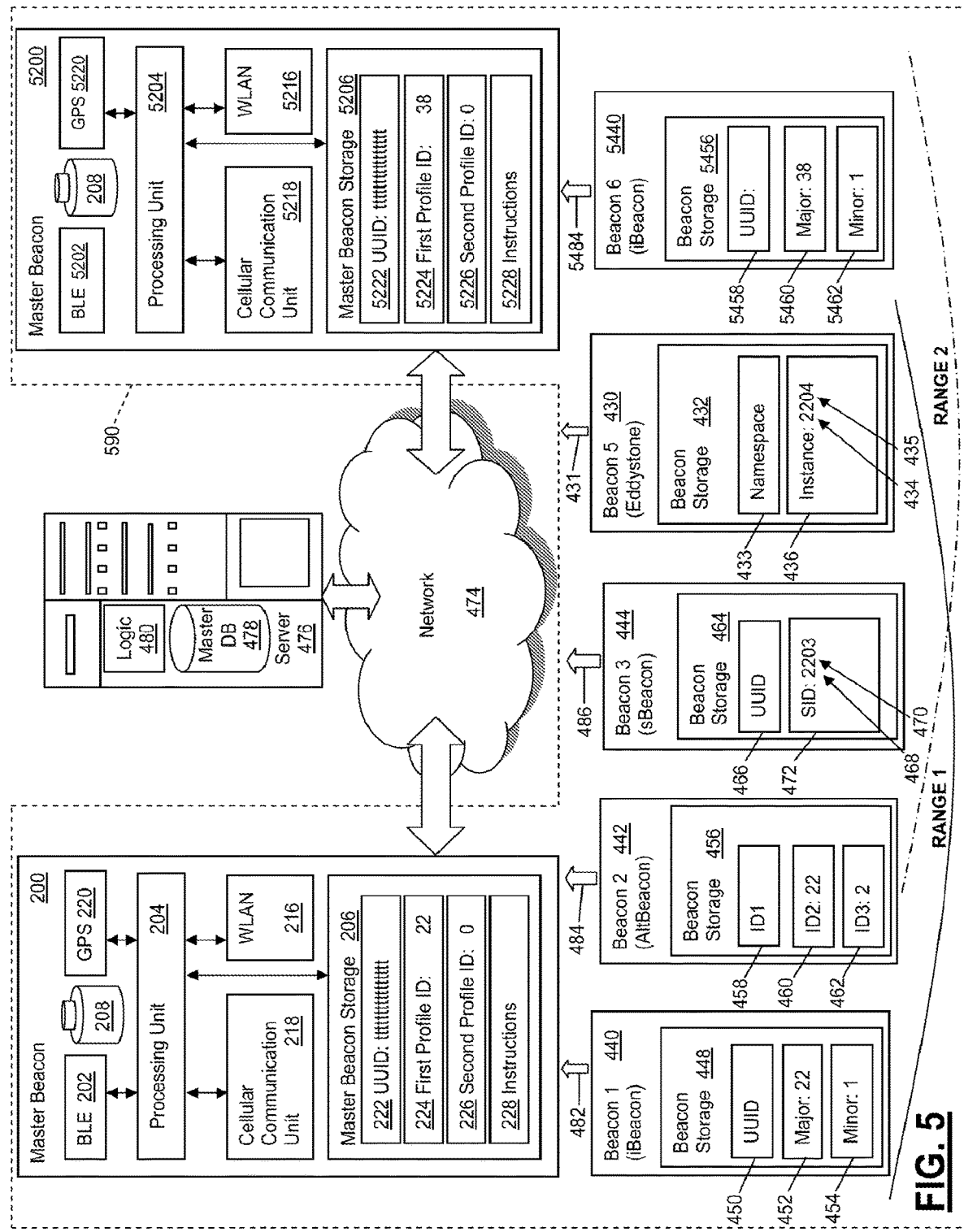
FIG. 5 illustrates schematically the result of a particular implementation of the method of FIG. 3 in which a server assigns two master beacons to a single logical metazone within a larger network.

After indexing the counter (step 334A in the method 300 shown in FIG. 3) and determining that the second beacon 442, third beacon 444 and fifth beacon 430 have yet to be handled (step 336A in the method 300 shown in FIG. 3), the master beacon 200 repeats the above process to capture the second beacon 442, as shown in FIG. 4C, capture the third beacon 444, as shown in FIG. 4D, and capture the fifth beacon 430, as shown in FIG. 4E. Thus, as shown in FIG. 4C, the master beacon 200 initiates a communications channel 490 with the second beacon 442 and switches the second beacon 442 into the receiving mode. The master beacon then changes the first profile identifier ("ID2") 460 for the second beacon 442 from its initial value of "63" to "22", matching the first profile identifier 224 of the master beacon 200, changes the second profile identifier ("ID3") 462 for the second beacon 442 to be equal to the current counter value of "2", and returns the second beacon 442 to transmit mode. Similarly, as shown in FIG. 4D, the master beacon 200 initiates a communications channel 492 with the third beacon 444 and switches the third beacon 444 into the receiving mode. The master beacon then changes the single "SID" string 472 for the third beacon 444 from "aabb", where "aa" is the first profile identifier 468 and "bb" is the second profile identifier 470, to "2203", where "22", matching the first profile identifier 224 of the master beacon 200, is the first profile identifier 468 and "3", the current counter value, is used to populate the second profile identifier 470 with "03". The master beacon 200 then returns the third beacon 444 to transmit mode. Likewise, as shown in FIG. 4E, the master beacon 200 initiates a communications channel 437 with the fifth beacon 430 and switches the fifth beacon 430 into the receiving mode. Once the fifth beacon 430 is in the receiving mode, the master beacon 200 then changes the single "Instance" string 436 for the fifth beacon 430 from "ddee" to "2204". Thus, the first profile identifier 434 is changed from "dd" to "22" to match the first profile identifier 224 of the master beacon 200 and the second profile identifier 435 is changed from "ee" to "04" based on the current counter value of "4". In each case, after returning the beacon 442, 444, 430 to the transmitting mode, the master beacon 200 triangulates the estimated position of the beacon 442, 444, 430 and stores the relevant information about the beacon 442, 444, 430 in the master database 478 via the network 474. Since the fourth beacon 446 is out of BLE range, it is not captured by the master beacon 200.

Figure 4F:
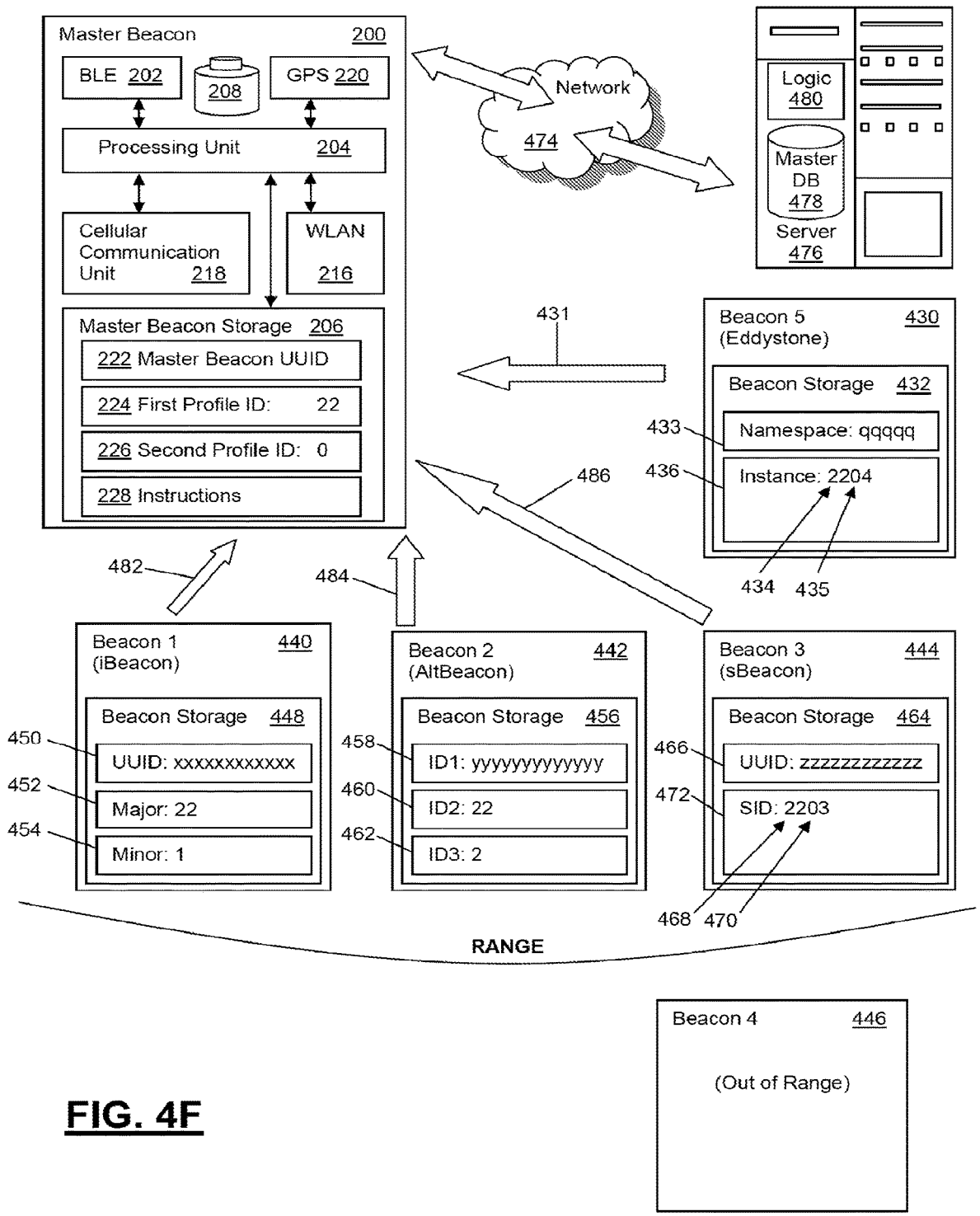

FIG. 4F shows the condition after the first beacon 440, second beacon 442, third beacon 444 and fifth beacon 430 have all been captured, creating a beacon network. The beacon network comprises the master beacon 200 and a plurality of beacons, namely the first beacon 440, second beacon 442, third beacon 444 and fifth beacon 430, each within BLE range of the master beacon 200. Since the beacons 440, 442, 444, 430 are conventional, as shown in FIGS. 1 and 1A, each of the beacons 440, 442, 444, 430 comprises a BLE unit, a beacon processor and a power source (not shown in FIGS. 4A to 4F) and a respective beacon storage 448, 456, 464, 432. For each beacon 440, 442, 444, 430 the beacon storage 448, 456, 464, 432 stores the UUID 450, 458, 466, 433 for that beacon 440, 442, 444, 430, the first profile identifier 452, 460, 468, 434 for that beacon 440, 442, 444, 430 and the second profile identifier 454, 462, 470, 435 for that beacon 440, 442, 444, 430. As can be seen in FIG. 4F, the first profile identifier 452, 460, 468, 434 for each beacon 440, 442, 444, 430 is "22", which is identical to the first profile identifier 224 for the master beacon 200, which is also "22". The second profile identifier 454, 462, 470, 435 for each beacon 440, 442, 444, 430 is unique within the plurality of beacons 440, 442, 444, 430. The second profile identifier 454 for the first beacon 440 is "1", the second profile identifier 462 for the second beacon 442 is "2", the second profile identifier 470 for the third beacon 444 is "3" and the second profile identifier 435 for the fifth beacon 430 is "4", each of which is unique within the set {1,2,3,4}. As shown in FIG. 4F, the first beacon 440, second beacon 442, third beacon 444 and fifth beacon 430 retain the manufacturer default value for their UUIDs 450, 458, 466, 433 denoted, respectively, by the arbitrary strings "xxxxxxxxxxxx", "yyyyyyyyyyyy", "zzzzzzzzzzzz" and "qqqqq". Although FIGS. 4A to 4F depict four beacons 440, 442, 444, 430 each having a different manufacturer (as indicated by the different UUID strings) and using a different protocol, FIGS. 4A to 4F and the accompanying description are equally applicable, mutatis mutandis, where one or more of the beacons originate from the same manufacturer and/or use the same protocol.

The instructions 228 in the master beacon storage 206 include instructions for connecting to the remote server 476 using at least one of the cellular communication unit 218 and the wireless local network unit 216, instructions for changing the first profile identifiers 452, 460, 468, 434 for the beacons 440, 442, 444, 430 and instructions for changing the second profile identifiers 454, 462, 470, 435 for the beacons 440, 442, 444, 430.

Reference is now made to FIG. 5, which shows the result of a particular implementation of the method 300 shown in FIG. 3 in which the server assigns two master beacons 200, 5200 to a single logical "metazone" 590 within a larger network. The arrangement shown in FIG. 5 results when a sixth beacon 5440 and a second master beacon 5200 are added to the beacon network shown in FIG. 5F. Note that in FIG. 5, the arbitrary strings "xxxxxxxxxxxx", "yyyyyyyyyyyy", "zzzzzzzzzzzz" and "qqqqq" representing the UUIDs 450, 458, 466, 433 for the first beacon 440, second beacon 442, third beacon 444 and fourth beacon 430 are omitted from the drawing to facilitate illustration. The sixth beacon 5440 and the second master beacon 5200 are identical to the first beacon 440 and the first master beacon 200 respectively, with like reference numerals denoting like features but with the additional prefix "5". The fourth beacon 446, which is out of BLE range of both the first master beacon 200 and the second master beacon 5200, is not shown in FIG. 5 in order to simplify illustration.

As can be seen in FIG. 5, the sixth beacon 5440 is out of BLE range of the first master beacon 200 ("Range 1") and is within BLE range of the second master beacon 5200 ("Range 2"). Additionally, the second beacon 442, third beacon 444 and fifth beacon 430 are in BLE range of both the first master beacon 200 and the second master beacon 5200. The first beacon 440 is only within BLE range of the first master beacon 200. When the second master beacon 5200 executes the method 300 shown in FIG. 3, it will detect at step 318A that the second beacon 442, third beacon 444 and fifth beacon 430 are already associated with the first master beacon 200, and therefore will not capture them. In addition, the second master beacon 5200 may report to the server 476 that it has detected beacons in BLE range that are already associated with another master beacon. The second master beacon 5200 will then capture the sixth beacon 5440, setting its first profile identifier ("major") 5460 to "38", identical to the first profile identifier 5224 for the second master beacon 5200, and setting the second profile identifier ("minor") for the sixth beacon 5440 to the counter value of "1". The UUID 5450 of the sixth beacon 5440 is identical to the UUID 450 of the first beacon 440 (indicating that the first beacon 440 and the sixth beacon 5440 come from the same manufacturer) is unchanged. (As noted above, the arbitrary string "xxxxxxxxxxxx" representing the UUID 450 for the first beacon 440 is omitted from in FIG. 5 to facilitate illustration.)

The server 476, executing the program logic 480, may assign the first master beacon 200 and the second master beacon 5200, together with their captured beacons 440, 442, 444, 430, 5440 to a single logical network zone 590 within a larger network. In so doing, the server 476 may change the master beacon identifier 222, 5222 for at least one of the first master beacon 200 and the second master beacon 5200 so that the first master beacon and the second master beacon have a common master beacon identifier, denoted by arbitrary string "tttttttttttt" (which is not intended as a literal representation of ASCII characters or octet lengths). Thus, the UUID 222 for the first master beacon 200 is identical to the UUID 5222 for the second master beacon 5200. The server 476 may, for example, change one master beacon identifier 222, 5222 to be identical to the other master beacon identifier 222, 5222, or may change both master beacon identifiers 222, 5222 to a new value. In either case, the common master beacon identifier 222, 5222 is globally unique within the larger network of beacons and master beacons; that is, the common master beacon identifier 222, 5222 designates the logical metazone 590 and is not used for any other logical metazone.

When placed within BLE range of beacons that have been deployed in their manufacturer default state, a master beacon will capture those beacons and superimpose an address scheme on those beacons in which the assigned first profile identifier is the primary address and the assigned second profile identifier is the secondary address. This superimposed address scheme can then be used in software applications that act on proximity to the beacons, without having to manually set or determine the UUID, first profile identifier and second profile identifier values individually for each beacon. In addition, any property of a sensor that can be changed over the air (i.e. by instructions when the beacon is in receiving mode) can be changed by using the superimposed address scheme to address the beacon. Specifically, the master beacon can be instructed, via its connection to the remote server, to change values for a captured beacon, without the need for an individual to be in BLE range of the beacon being changed. The master database can also associate each beacon with its triangulated local position and, where the master beacon includes a GPS unit, with a global position (by combining the triangulated position of the beacon relative to the master beacon with the GPS-determined position of the master beacon). This enables the triangulated position of the beacons to be incorporated into the address scheme. For example, the initial counter-based values assigned to the second profile identifiers could later be re-assigned, based on triangulated position, to match a pre-defined position-based address scheme.

The above-described embodiments enable the development of application code that makes use of beacons without needing to change (or determine) the UUID, first profile identifier or second profile identifier for each beacon individually. Instead of having to impose the address scheme (the values for the UUID, first profile identifier, second profile identifier) used by the application code on each beacon, one beacon at a time, the beacons can be positioned and then the master beacons can be placed in the appropriate locations to capture the beacons. The address scheme can then be imposed on all of the captured beacons by having the server provide appropriate instructions to the master beacons. The first profile identifier and second profile identifier assigned by the master beacon serve as ad-hoc networking identifiers in the master database, and associate each beacon with both a primary address, based on the assigned first profile identifier, and a secondary address, based on the assigned second profile identifier.

For example, consider a case where a chain of retail department stores wishes to place beacons in its shoe departments, with one beacon indicating the area for children's shoes, one beacon indicating the area for ladies' shoes, and one beacon indicating the area for gentlemen's shoes. Instead of having to set or determine values for the first profile identifier and second profile identifier of each beacon individually, the beacons can simply be placed in the desired locations and then a master beacon having a known first profile identifier can be placed in the shoe department within BLE range of the beacons. The master beacon then captures the beacons, assigning them their new first profile identifiers (all identical to the master beacon first profile identifier) and second profile identifiers (assigned sequentially based on the counter) and triangulating their relative positions, and then stores the information in the master database. Optionally, the second profile identifiers may be re-assigned based on triangulated position, to match a pre-defined position-based address scheme.

Proximity-based software applications, such as a smartphone application that presents advertisements based on a proximity to a particular area in the shoe department, can then be developed with knowledge only of the master beacon first profile identifier and the relative positions of the beacons. Thus, the beacons can be addressed by primary address via the first profile identifier and by secondary address via the second profile identifier, which is a unique (within the primary address) serial number associated with its relative position. A developer or a software program could consult the master database to determine the values of the UUIDs, first profile identifiers and second profile identifiers of the beacons at particular positions in the shoe department, rather than having to set or determine those values individually for each beacon either before or after installation. Alternatively, if after triangulation the second profile identifiers are re-assigned to match a pre-defined position-based address scheme, application code could be developed according to that pre-defined position-based address scheme for the beacons, before the beacons are installed or positioned, and in fact even before the beacons are manufactured. Once the beacons are in position, master beacons can then be placed within BLE range to capture the beacons and used, in cooperation with the master server, to superimpose the pre-defined position-based address scheme on the captured beacons. Thus, the application code can include instructions to look for a beacon having a first profile identifier corresponding to the master beacon placed in the general location and having a specified second profile identifier according to the pre-defined position-based address scheme.

As noted above, the master beacon does not change the UUID of the beacons it captures. If it is necessary to provide further granularity in addressing, the master beacon could be configured to change the UUID as well. Since the master beacon uses the UUID to determine the manufacturer of the beacon and hence the appropriate security protocol (step 320A or 320B of the method 300 in FIG. 3), in such an arrangement, the master beacon could record an association between the new UUID and the manufacturer or security protocol for later retrieval, or use predetermined UUIDs, or assign UUIDs according to a scheme which retains the association between the UUID and the security protocol for the beacon. Conversely, if it is desired to place a beacon in BLE range of a master beacon without the master beacon capturing that beacon, the UUID for the beacon could be changed to one that is not recognized by the master beacon. For example, a smartphone configured to operate as a beacon would not be captured by a master beacon because its UUID would prevent it from being recognized by the master beacon as a beacon to be captured. Thus, the master beacon can be configured to capture only certain beacons, based on the UUID of the respective beacons.

A master beacon can also detect a failed beacon (e.g. where the power source has failed) as well as the introduction of a "foreign" beacon (a beacon that is not supposed to be within BLE range of the master beacon) by comparing the number of beacons detected by the master beacon to an expected number recorded in the master database. This approach can also be used to assess the positional distribution of the beacons, by determining that there are too many beacons within BLE range of a first master beacon and not enough beacons within BLE range of a second master beacon.

The exemplary method 300 shown in FIGS. 3 and 4A to 4F is merely one particular exemplary implementation of a method of automatically linking beacons to a (first) master beacon. Stated more generally, the present disclosure contemplates a method of automatically linking beacons to a master beacon in which the master beacon automatically detects each beacon in a plurality of beacons and, for a set of beacons in the plurality of beacons, automatically changes either the first profile identifier or the second profile identifier for each beacon in the set of beacons to be both (a) identical for each beacon in the set of beacons; and (b) associated with the master beacon. Preferably, whichever of the first profile identifier and the second profile identifier is not set to be identical is set to be unique within the set of beacons to better distinguish among the beacons in the set of beacons. In the exemplary method 300 illustrated and described above, the master beacon changes the first profile identifier for each beacon in the set of beacons to be identical and changes the second profile identifier to be unique within the set of beacons, and the first profile identifier for each beacon in the set of beacons is associated with the master beacon by being identical to a first profile identifier for the first master beacon. The foregoing implementation is presently preferred because it provides a straightforward addressing scheme; other implementations are also contemplated by the present disclosure.

For example, in one alternate implementation the master beacon could set the second profile identifier for each beacon in the set of beacons to be identical and set the first profile identifier for each beacon in the set of beacons to be unique within the set of beacons. In such an alternate implementation, the second profile identifier for each beacon in the set of beacons may be set to be identical to a second profile identifier for the master beacon.

Moreover, setting either the first profile identifier or the second profile identifier for each beacon in the set of beacons to be identical with a first profile identifier or a second profile identifier for the master beacon is merely one exemplary technique by which the first profile identifier or second profile identifier for each beacon in the set of beacons may be associated with the master beacon. In other implementations, the master beacon may have only a single identifier, which may be different from the first profile identifier or the second profile identifier for each beacon in the set of beacons, and the association between the first profile identifier or the second profile identifier and the master beacon may be maintained as part of a data record, for example in the master database on the remote server.

Although the present disclosure refers to the iBeacon, sBeacon, AltBeacon and Eddystone beacon protocols, these are merely exemplary and not limiting. Aspects of the present disclosure may be applied in respect of any beacon whose protocol, whether now extant or hereinafter developed, provides for an advertisement including a UUID, first profile identifier and second profile identifier (including a single profile identifier that can be notionally divided into a first profile identifier and second profile identifier).

As can be seen from the above description, the beacon addressing systems and methods described herein represent significantly more than merely using categories to organize, store and transmit information and organizing information through mathematical correlations. The beacon addressing systems and methods are in fact an improvement to the technology of beacons, as they provide an efficient addressing structure for communicating with and using the beacons and for developing software that interacts with the beacons. Moreover, the beacon addressing systems and methods are applied in respect of a particular machine, namely a beacon as defined herein. As such, the beacon addressing systems and methods technology is confined to beacon applications.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing have been noted above, but these noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the technology described herein may be embodied as a system, method or computer program product. Accordingly, aspects of the technology described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the presently described technology may take the form of a computer program product embodied in one or more computer readable medium(s) carrying computer readable program code.

Where aspects of the technology described herein are implemented as a computer program product, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Thus, computer readable program code for implementing aspects of the technology described herein may be contained or stored in the memory of an onboard computer system of a smartphone or in memory of a computer, or on a computer usable or computer readable medium external to the onboard computer system of a smartphone or a computer, or on any combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the presently described technology may be written in any combination of one or more programming languages, including an object-oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

Certain embodiments have been described by way of example. It will be apparent to persons skilled in the art that a number of variations and modifications can be made without departing from the scope of the claims.

What is claimed is:

1. A method of automatically linking beacons to a first master beacon, the method comprising:
    automatically detecting, by the first master beacon, each beacon in a plurality of beacons by detecting a beacon advertisement for each beacon, wherein the beacon advertisement includes a universally unique identifier (UUID) for the respective beacon, a first profile identifier for the respective beacon and a second profile identifier for the respective beacon,
    wherein the UUID, the first profile identifier, and the second profile identifier stored are stored in a beacon storage on the respective beacon;
    for each beacon in a set of beacons in the plurality of beacons, automatically changing, by the first master beacon, one of a first profile identifier and a second profile identifier for each beacon in the set of beacons so that the one of the first profile identifier and the second profile identifier is identical for each beacon in the set of beacons; and the one of the first profile identifier and the second profile identifier is associated with the master beacon; and
    updating information in a master database hosted by a server that is in a location physically remote from the master beacon, wherein the information comprises the UUID, the first profile identifier and the second profile identifier of each beacon in the set of beacons.
2. The method of claim 1, wherein the set of beacons is all of the beacons in the plurality of beacons.
3. The method of claim 1, wherein the set of beacons is a subset of the beacons in the plurality of beacons.
4. The method of claim 1, wherein:
    the one of the first profile identifier and the second profile identifier for each beacon in the set of beacons is the first profile identifier for each beacon in the set of beacons; and
    the first profile identifier for each beacon in the set of beacons is associated with the master beacon by being identical to a first profile identifier for the master beacon.
5. The method of claim 4, further comprising, for each beacon in the set of beacons, automatically changing, by the first master beacon, a second profile identifier for that beacon to be unique within the set of beacons.

6. The method of claim 5, further comprising:
for each beacon in the set of beacons:
    before automatically changing the first profile identifier for that beacon and the second profile identifier for that beacon, the first master beacon automatically switching that beacon from a transmitting mode into a receiving mode; and
    after automatically changing the first profile identifier for that beacon and the second profile identifier for that beacon, the first master beacon automatically switching that beacon from the receiving mode into the transmitting mode.
7. The method of claim 6, wherein:
automatically detecting, by the first master beacon, each beacon in the plurality of beacons comprises the first master beacon obtaining an advertisement from each beacon;
wherein the first master beacon automatically switching each beacon in the set of beacons from the transmitting mode into the receiving mode comprises, for each beacon in the set of beacons:
    the first master beacon using the advertisement from that beacon to identify a security protocol for that beacon; and
    the first master beacon using the security protocol for that beacon to switch that beacon from the transmitting mode into the receiving mode; and
wherein the first master beacon automatically switching each beacon in the set of beacons from the receiving mode into the transmitting mode comprises, for each beacon in the set of beacons, using the security protocol for that beacon to switch that beacon from the receiving mode into the transmitting mode.
8. The method of claim 5, further comprising:
for each beacon in the set of beacons, the master beacon storing, in a master database on a server remote from the master beacon:
    a UUID for that beacon;
    the changed first profile identifier for that beacon; and
    the changed second profile identifier for that beacon.
9. The method of claim 8, further comprising:
for each beacon:
    before automatically changing the first profile identifier for that beacon and the second profile identifier for that beacon, the first master beacon checking the master database for whether that beacon is already associated with another active master beacon;
wherein, for each beacon, the first master beacon automatically changes the first profile identifier for that beacon and the second profile identifier for that beacon only if that beacon is not already associated with another active master beacon.
10. The method of claim 9, further comprising:
the server assigning the first master beacon and a second master beacon to a single logical network zone within a larger network;
the server changing a master beacon identifier for at least one of the first master beacon and the second master beacon so that the first master beacon and the second master beacon have a common master beacon identifier;
the common master beacon identifier being globally unique within the network.
11. The method of claim 8, further comprising:
for each beacon in the set of beacons, the master beacon:
    triangulating an estimated position of that beacon; and
    storing the estimated position of that beacon in the master database.

* * * * *

UNITED STATES PATENT AND TRADEMARK OFFICE
CERTIFICATE OF CORRECTION

PATENT NO.         : 10,979,853 B2
APPLICATION NO.    : 16/552185
DATED              : April 13, 2021
INVENTOR(S)        : Aaron Lyon Phillips-Lubimiv et al.

Page 1 of 1

It is certified that error appears in the above-identified patent and that said Letters Patent is hereby corrected as shown below:

In the Claims

Claim 1, Column 21, Line 34, should read "second profile identifier are stored in a beacon"
Claim 8, Column 22, Line 33, should read "storing, in the master database on the server remote from"

Signed and Sealed this
First Day of June, 2021

Drew Hirshfeld
*Performing the Functions and Duties of the*
*Under Secretary of Commerce for Intellectual Property and*
*Director of the United States Patent and Trademark Office*